United States Patent
Landes et al.

(10) Patent No.: US 9,496,546 B2
(45) Date of Patent: Nov. 15, 2016

(54) STORAGE STRUCTURE OF AN ELECTRICAL ENERGY STORAGE CELL

(71) Applicant: Siemens Aktiengesellschaft, Munich (DE)

(72) Inventors: Harald Landes, Ruckersdorf (DE); Carsten Schuh, Baldham (DE); Thomas Soller, Landau/Isar (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/383,558

(22) PCT Filed: Mar. 14, 2013

(86) PCT No.: PCT/EP2013/055187
§ 371 (c)(1),
(2) Date: Sep. 7, 2014

(87) PCT Pub. No.: WO2013/135790
PCT Pub. Date: Sep. 19, 2013

(65) Prior Publication Data
US 2015/0140454 A1    May 21, 2015

(30) Foreign Application Priority Data
Mar. 16, 2012 (DE) ........................ 10 2012 204 170

(51) Int. Cl.
*H01M 8/22* (2006.01)
*H01M 4/48* (2010.01)
(Continued)

(52) U.S. Cl.
CPC ................. *H01M 4/36* (2013.01); *H01M 4/38* (2013.01); *H01M 4/523* (2013.01); *H01M 4/628* (2013.01);
(Continued)

(58) Field of Classification Search
CPC .............. H01M 2004/021; H01M 4/46; H01M 4/48; H01M 4/463; H01M 4/466; H01M 4/8621
(Continued)

(56) References Cited

U.S. PATENT DOCUMENTS 4,109,060 A * 8/1978 Andersson .............. H01M 4/02
                                                            204/284
6,103,393 A    8/2000 Kodas et al.
(Continued)

FOREIGN PATENT DOCUMENTS

CN              1355941 A       6/2002
DE          102012215929 A1     3/2013
(Continued)

OTHER PUBLICATIONS

Akisuke et al; "Synthesis of nano-Fe3O4-loaded tubular carbon nanofibers and their application as negative electrodes for Fe/air batteries"; Journal of Power Sources, Elsevier SA; Bd. 196, nr. 19; pp. 8154-8159; ISSN: 0378-7753, DOI 10.1016/j.jpowsour.2011.05.043; May 6, 2011.
(Continued)

*Primary Examiner* — Patrick Ryan
*Assistant Examiner* — Julian Anthony
(74) *Attorney, Agent, or Firm* — Beusse Wolter Sanks & Maire

(57) ABSTRACT

A storage structure of an electrical energy storage cell is provided having an active storage material, wherein the active storage material has a particle size distribution which has a $d_5$ value of at least 0.1 µm and a $d_{50}$ value of between 0.8 µm and 1.1 µm, wherein the $d_{95}$ value of the particle size distribution is lower than 10 µm.

9 Claims, 3 Drawing Sheets

(51) Int. Cl.
*H01M 8/10* (2016.01)
*H01M 4/36* (2006.01)
*H01M 4/38* (2006.01)
*H01M 4/52* (2010.01)
*H01M 4/62* (2006.01)
*H01M 12/08* (2006.01)
*H01M 12/02* (2006.01)
*H01M 4/02* (2006.01)

(52) U.S. Cl.
CPC ............ *H01M 12/02* (2013.01); *H01M 12/08* (2013.01); *H01M 2004/021* (2013.01); *H01M 2300/0068* (2013.01)

(58) Field of Classification Search
USPC .................................................. 429/402, 405
See application file for complete search history.

(56) References Cited

U.S. PATENT DOCUMENTS

| | | | |
|---|---|---|---|
| 6,686,093 | B1 | 2/2004 | Sakai et al. |
| 6,967,183 | B2 | 11/2005 | Hampden-Smith et al. |
| 7,138,159 | B2 | 11/2006 | Hampden-Smith et al. |
| 7,211,345 | B2 | 5/2007 | Hampden-Smith et al. |
| 7,507,687 | B2 | 3/2009 | Hampden-Smith et al. |
| 7,563,537 | B2 * | 7/2009 | Pratt .................... H01M 4/244 429/229 |
| 2002/0107140 | A1 | 8/2002 | Hampden-Smith et al. |
| 2003/0064265 | A1 | 4/2003 | Hampden-Smith et al. |
| 2003/0099882 | A1 | 5/2003 | Atanassova Paolina et al. |
| 2003/0118884 | A1 | 6/2003 | Hampden-Smith et al. |
| 2003/0130114 | A1 | 7/2003 | Hampden-Smith et al. |
| 2004/0072683 | A1 | 4/2004 | Hampden-Smith et al. |
| 2007/0122709 | A1 | 5/2007 | Pratt et al. |
| 2008/0113257 | A1 | 5/2008 | Hampden-Smith et al. |
| 2009/0202876 | A1 | 8/2009 | Shimamura et al. |
| 2011/0007617 | A1 | 1/2011 | Tachino et al. |

FOREIGN PATENT DOCUMENTS

| | | |
|---|---|---|
| JP | H09894 A | 1/1997 |
| JP | 2003528419 A | 9/2003 |
| JP | 2004507341 A | 3/2004 |
| JP | 2005026143 A | 1/2005 |
| JP | 2006142275 A | 6/2006 |
| JP | 2011018388 A | 1/2011 |
| JP | 2011253675 A | 12/2011 |
| WO | 0193999 A2 | 12/2001 |

OTHER PUBLICATIONS

Kannan et al; "Rechargeable iron/air cells employing bifunctional oxygen electrodes of oxide pyrochlores"; Journal of Power Sources, Elsevier SA; Bd. 35, Nr. 2; pp. 113-121; ISSN: 0378-7753, DOI 10.1016/0378-7753(91)80028-V, XP000233205; Jul. 1, 1991.

* cited by examiner

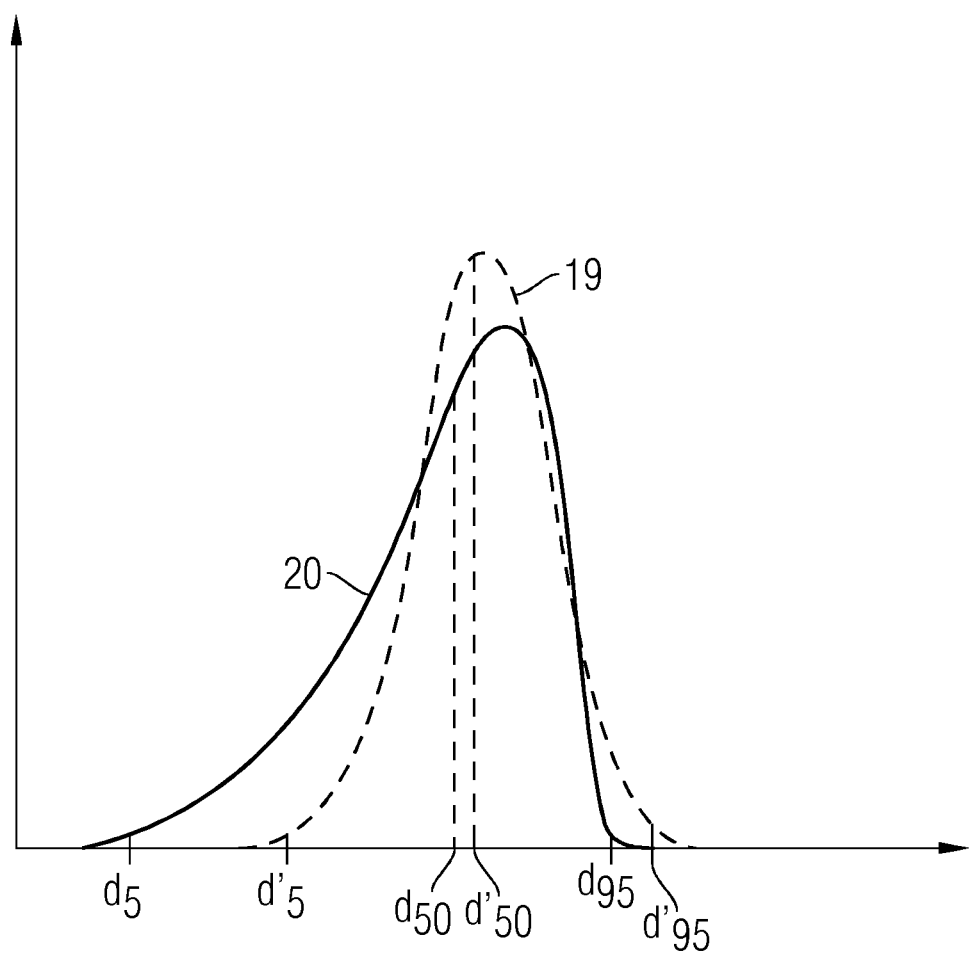

STORAGE STRUCTURE OF AN ELECTRICAL ENERGY STORAGE CELL

CROSS REFERENCE TO RELATED APPLICATIONS

This application is the US National Stage of International Application No. PCT/EP2013/055187 filed Mar. 14, 2013, and claims the benefit thereof. The International Application claims the benefit of German Application No. DE 102012204170.2 filed Mar. 16, 2012. All of the applications are incorporated by reference herein in their entirety.

FIELD OF INVENTION

The invention relates to a storage structure of an electrical energy storage cell.

BACKGROUND OF INVENTION

Excess electrical power originating, for example, from renewable energy sources can be stored in the power grid only to a limited degree. This also applies to excess power which is obtained in fossil power plants when they are running within the optimal economic load range but the power is not being demanded by the consumer from the grid. There are various large-scale storage devices for intermediate storage of this excess power in relatively large amounts. One of these is, for example, a pumped storage power plant. In the battery sector, one approach for electrical energy storage means is to use rechargeable oxide batteries (ROB), i.e. high-temperature metal/air batteries. In these batteries, a metal-based storage medium is reduced or oxidized according to the state of the battery (charging or discharging). In the course of a multitude of these cyclical charging and discharging operations, i.e. oxidation and reduction operations, of the storage medium, there is a tendency in this medium, at the comparatively high operating temperatures to which such a battery is subjected, which are typically between 600° C. and 800° C., for the required microstructure, especially the pore structure of the storage medium, to be destroyed by sintering processes. This leads to aging and subsequently to failure of the battery.

SUMMARY OF INVENTION

It is an object of the invention to provide a storage cell of an electrical energy storage means, which has a higher long-term stability compared to the prior art and withstands a higher number of cycles of charging and discharging operations.

The solution to the problem is a storage structure having the features of the claims.

The inventive storage structure of an electrical energy storage cell comprises an active storage material and has the feature that the active storage material has a particle size distribution having a $d_5$ of at least 0.1 μm and a $d_{50}$ between 0.1 μm and 1.5 μm. In addition, it is a feature of the storage structure that a $d_{95}$ of the particle size distribution is less than 10 μm. In this context, the term $d_{50}$ is understood to mean that 50% of all the particles are smaller than the stated value. Analogously, the $d_5$ means that 5% of the particles are smaller than the stated 0.1 μm, and the $d_{95}$ means that 95% of all the particles are smaller than the stated value of 10 μm.

This particle size distribution is the particle size distribution of the starting materials of the active storage material for the storage structure. In the finished storage structure, the individual grains of the active storage material are in compressed or pre-sintered form, such that, at the microscopic level, there is formation of agglomerates or of cohesive connections in contact regions which are also referred to as sinter necks. The individual grains can thus, as a result of a thermal treatment, fuse at the contact regions through diffusion processes, the effect of which is that they become microscopically visible as a larger grain. Therefore, for physical characterization of the active storage material, the particle size distribution of the starting material is used, and this particle size distribution reflects, albeit with cohesive contact areas in the microstructure of the finished storage material or of the finished storage structure.

In an advantageous configuration of the invention, the particle size distribution of the starting material of the active storage material is characterized in such a way that a $d_5$ is less than 0.2 μm, the $d_{50}$ of the particle size distribution is between 0.3 μm and 1, 1.5 μm, and the $d_{95}$ is less than 3 μm.

Each of the embodiments claimed involves a comparatively narrow particle size distribution, and the $d_{50}$ with an order of magnitude around about 1 μm, i.e. between 0.8 μm and 1.1 μm, constitutes a range which is small enough, such that the particles have a very large surface area based on the volume thereof, the effect of which is in turn that the reactivity thereof with a reactant still to be elucidated is sufficiently high. Secondly, this $d_{50}$ is selected at a sufficiently high level that there is not necessarily immediate sintering when the storage structure is operated at process temperatures of the energy storage cell between 600° C. and 800° C. This would occur for a particle size distribution if a $d_{50}$ were to lie close to the nanometer range. It has thus been found in accordance with the invention that specifically a $d_{50}$ around the region of 1 μm is particularly advantageous; in addition, the entire particle size distribution has to be very narrow, and therefore the $d_5$ must not be smaller than 0.1 μm or, in an even more advantageous configuration of the invention, not smaller than 0.2 μm. This means that 95% of the grains of the active storage material used are larger than 0.2 μm but also smaller than 3 μm or 10 μm.

Such a narrow distribution structure of the particles of the active storage material with the given $d_{50}$ thus has the effect that the particles are large enough that they do not have a tendency to elevated sintering, like the nanoparticles; secondly, the mean value of the particles is sufficiently small that the active surface area of the individual grains of the active storage material is sufficiently high that the corresponding chemical processes, especially redox processes, proceed very rapidly, which advantageously shortens the cycle times of the energy storage cell and increases the performance of the storage cell. In addition, any adverse effects that are caused by raw material or process contamination can be minimized by the high active surface area of the grains of the active storage material.

For even better stabilization of the storage structure against sintering over several cycles of a chemical process in the storage cell, especially of the redox process, it is appropriate also to introduce an inert material in divided form into the raw materials of the active storage material, in which case this inner material is present in the storage structure in finely divided form between the grains of the active storage material. Such an inert material likewise has a maximum grain size of 10 μm, especially of 3 μm. Such an inert material acts as a support structure which additionally further reduces the sintering tendency of the storage material. The proportion by volume of the inert material in the storage material here is advantageously less than 50%, especially between 5% and 15%.

In this context, the term "inert" is understood to mean that a chemical equilibrium between the inert material and a possible reactant is set to be sufficiently slow that, at the prevailing operating temperatures, there are no reactions that have a lasting effect on the functionality of the storage structure. This is especially understood to mean inert behavior toward a gaseous or liquid reactant which in turn enters into a reaction with the storage material. Moreover, this is understood to mean inert behavior with respect to the storage material per se. More particularly, useful inert storage materials are zirconium oxide, calcium oxide, magnesium oxide or aluminum oxide.

An open porosity of the storage structure, i.e. the empty volume between the grains of the active storage material and of any inert material, is between 15% and 30% by volume.

On the one hand, an open porosity in this order of magnitude is small enough that a maximum amount of active storage material can be accommodated per unit volume; on the other hand, it is large enough that a gaseous reactant can be transported to the active storage material at a sufficiently high speed.

The shape of the grains of the active storage material is advantageously aspherical. In this context, the grains may preferably be in oblate, prolate, platelet-shaped, acicular or tubular form, because such an aspherical, i.e. non-ball-shaped, particle morphology increases the surface to volume ratio of the particles.

In a preferred embodiment of the invention, the active storage material is in the form of iron oxide. In the course of production of the storage structure, the iron oxide is typically in the form of $Fe_2O_3$ (iron(III) oxide); during the operation of the storage cell, the oxidation states of the iron generally change, while the operation of the storage cell takes place with the compounds FeO (iron(II) oxide) and/or $Fe_3O_4$ (iron(II, III) oxide). The active storage material is especially in the form of a redox pair consisting of iron and iron oxide, the proportion of the respective components being dependent on the charge state of the electrical storage cell.

Further features of the invention and further advantages are elucidated in detail with reference to the figures which follow. The description of the figures comprises illustrative configurations of the invention which do not constitute a restriction of the scope of protection.

DETAILED DESCRIPTION OF INVENTION

Figure 1:
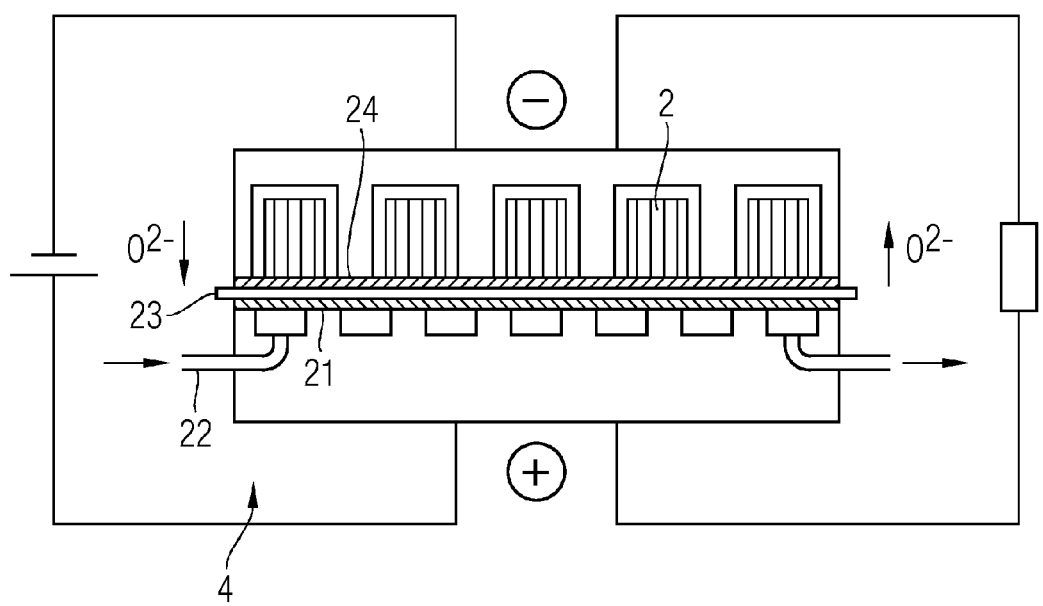
FIG. 1 a schematic view of the way in which an electrical storage cell works.

With reference to FIG. 1, there will first of all be a description, in schematic form, of the way in which a rechargeable oxide battery (ROB) works, to the extent necessary for the present description of the invention. A standard setup of an ROB involves blowing in a process gas, especially air, via a gas supply 18 at a positive electrode 21, which is also referred to as air electrode, with removal of oxygen from the air. The oxygen passes in the form of oxygen ions $O^{2-}$ through a solid electrolyte 23 that adjoins the positive electrode to a negative electrode 24, which is also referred to as storage electrode. If an impervious layer of the active storage material were thus to be present on the negative electrode 24, i.e. on the storage electrode, the storage capacity of the battery would thus rapidly be exhausted.

For this reason, it is appropriate to use a storage structure 2 made from porous material on the negative electrode as energy storage medium, the latter containing a functionally active oxidizable material as an active storage material 6, preferably in the form of iron and iron oxide.

By means of a redox pair which is gaseous in the operating state of the battery, for example $H_2/H_2O$, the oxygen ions transported through the solid-state electrolyte 25 are transported through pore channels 17 in the porous storage structure 2 comprising the active storage material 6. According to whether a charging or discharging operation is in progress, the metal or the metal oxide (iron/iron oxide) is being oxidized or reduced and the oxygen required for that purpose is being supplied by the gaseous redox pair $H_2/H_2O$ or is being transported back to the solid-state electrolyte. This mechanism is also referred to as the shuttle mechanism.

The advantage of iron as oxidizable material, i.e. as active storage material 6, is that it has about the same open-circuit voltage of about 1 V in its oxidation process as the redox pair $H_2/H_2O$.

Especially the diffusion of the oxygen ions through the solid-state electrolyte 23 requires a high operating temperature of 600 to 800° C. in the ROB described. In this context, not only the structure of the electrodes 21 and 24 and of the electrolyte 23 is subject to a high thermal stress, but also the storage structure 2 comprising the active storage material 6. In the constant cycles of oxidation and reduction, the active storage material has a tendency to sinter, meaning that the individual grains fuse together to an ever greater extent, until the reactive surface area becomes very small and the pore structure is closed. In the event of a closed pore structure, the redox pair $H_2/H_2O$ can no longer reach the active surface of the active storage material 6, and so the capacity of the battery is very rapidly exhausted.

One advantage of the ROB is that it can be extended in a virtually unlimited modular manner by virtue of its smallest unit, namely the storage cell. Thus, a small battery for stationary domestic use can be executed, as can an industrial scale system for storage of the energy from a power plant.

Figure 2:
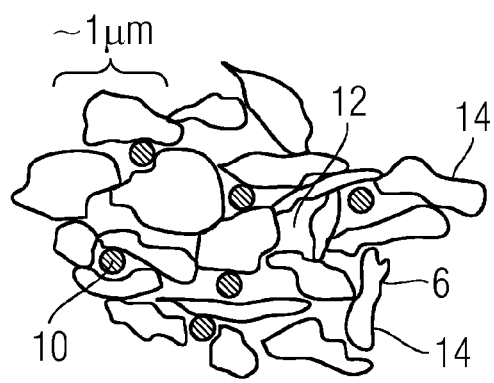
FIG. 2 a schematic view of the microstructure of the storage structure in the compressed state, FIG. 3 the microstructure according to FIG. 2 after a thermal treatment with sinter neck binding, and an enlarged section therefrom, and FIG. 4 two examples of a particle size distribution.
Figure 3:
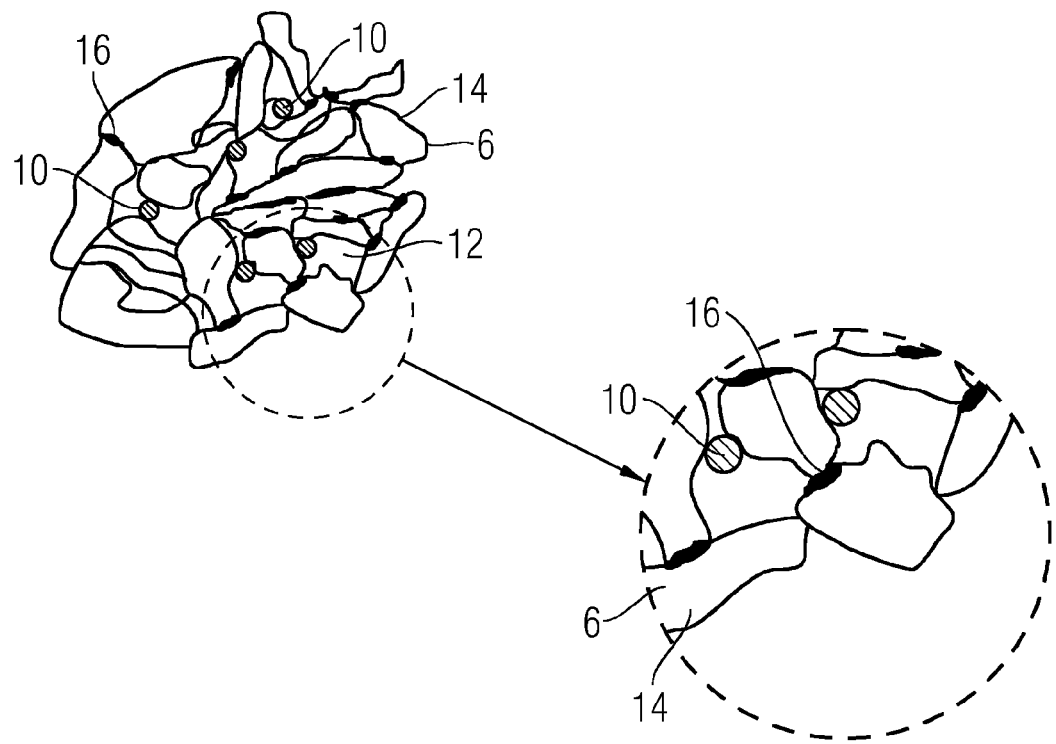

FIGS. 2 and 3 show, in schematic form, illustrative microstructures of the storage structure. In FIG. 2, leaflet-shaped grains 14 of an active storage material 6 are in compressed form. Such a storage structure can be produced inexpensively, for example, through a uniaxial compression operation. In principle, however, other shaping processes, for example isostatic pressing, hot isostatic pressing, slip casting, sedimentation processes, film casting and lamination processes, and also screen printing or electrophoretic deposition or extrusion, are likewise appropriate. The grains 14 of the active storage material 6 in FIG. 2 are present merely in compressed form; in this case, the individual grains 14 are held together by mechanical clamping.

A particle size distribution 19, 20 (cf. FIG. 4) of the grains 14 of the active storage material 6 is configured such that half of the grains (particles) have a diameter of less than 1 μm. The $d_{50}$ of the distribution curve 19, 20, i.e. the $d_{50}$ value, is thus 1 μm. This is indicated in purely schematic form by the scale of 1 μm in the upper region of FIG. 2 outside the microstructure. The particle size is very narrow, such that all of or a majority of the grains have a substantially equal grain size. This is manifested by the fact that the particle size distribution is configured such that only 5% of the grains are smaller than 200 μm. The $d_5$ is thus 200 μm.

In addition, the grains should not be too large; preferably not more than 5% of the particles should be larger than 3 μm. Particles in the order of magnitude around 1 μm have the particular advantage, for use as active storage material 6, of having a sufficiently high surface to volume ratio which ensures a good reaction with the reactants $H_2/H_2O$. The surface to volume ratio would of course be better in the case of particles in the nanometer range, but these would sinter immediately with one another to form large grains, which would in turn have a lasting effect on, or entirely prevent, gas permeability and would subsequently lead to stoppage of the reactivity of the active storage material with the reactant from the redox pair $H_2/H_2O$. The operability of the storage cell 4 would thus be terminated.

In the storage structure according to FIG. 2, for further reduction of the sintering tendency, inert particles 10 are introduced, these being in very finely divided form and consisting, for example, of an oxidic material such as zirconium oxide, aluminum oxide, calcium oxide, magnesium oxide or the like. This inert material is especially inert toward the iron oxide or iron and toward the $H_2/H_2O$ reactant. The proportion of the inert material in this example is 10% of the volume of the overall storage structure. The inert support particles 10 support the entire structure at the operating temperatures of about 700° C.

FIG. 3 shows an alternative storage structure 2 which has been subjected to a thermal treatment, with sinter necks 16 having formed through diffusion processes between the individual grains 14 of the active storage material 6. There is thus now a cohesive connection between the individual grains 14. This cohesive connection in the form of sinter necks 16 serves for additional stabilization of the storage structure 2, but it is still so minor that the individual grains 14 are not completely fused to one another, but have essentially retained their original grain structure. Such partial sintering, however, is appropriate in order to increase the mechanical and thermal stability of the storage structure 2. In the enlarged cross section of the dotted circle shown in FIG. 3, the sinter necks 16 and the individual particles 10 are shown once again with better clarity; it can also be seen that the individual particles 14 have retained their original overall structure.

FIG. 4 shows, in schematic form, two particle distribution curves that frequently occur. On the x axis is plotted the respective particle diameter; the y axis shows the relative frequency of the particles; it is shown purely in schematic form and is therefore not provided with numerical values. Shown here as a dotted line is a typical Gaussian distribution 19, which is a symmetrical frequency distribution. For the use of the storage structure 2 described, however, an asymmetric grain size distribution or particle size distribution according to the Lifshitz-Slyozov-Wagner (LSW) theory may be appropriate. The LSW distribution also results in practice from the fact that Ostwald ripening occurs in the reaction of the particles with one another, such that the particles present, after several thermal treatment cycles, have a tendency to an increase in particle size at the expense of smaller particles. The LSW distribution 20 counters this effect.

The invention claimed is:

1. An active storage material for the storage structure of an electrical metal/air energy storage cell, comprising compressed pre-sintered metal oxide particles having a particle size distribution with a $d_5$ no smaller than 0.2 μm, a $d_{50}$ between 0.3 μm and 1.5 μm, and a $d_{95}$ less than 3 μm.

2. The active storage material of claim 1, wherein the metal is iron.

3. The active storage material of claim 2, wherein the metal oxide is $Fe_2O_3$.

4. The active storage material of claim 1, further comprising 5-15% by volume particles of an inert material selected from the group consisting of zirconium oxide, calcium oxide, magnesium oxide and aluminum oxide, wherein the particles of inert material have a maximum size of 10 μm.

5. The active storage material of claim 1, which has an open porosity between 15% and 30%.

6. The active storage material of claim 4, which has an open porosity between 15% and 30%.

7. The active storage material of claim 1, wherein the metal particles of the active storage material are aspherical.

8. The active storage material of claim 1, further comprising 5-15% by volume particles of an inert material selected from the group consisting of zirconium oxide, calcium oxide and aluminum oxide, wherein the particles of inert material have a maximum size of 10 μm.

9. An active storage material for the storage structure of an electrical metal/air energy storage cell, comprising compressed pre-sintered metal oxide particles having a particle size distribution with a $d_5$ no smaller than 0.2 μm, a $d_{50}$ between 0.3 μm and 1.5 μm, and a $d_{95}$ less than 3 μm, and an open porosity between 15% and 30%.

* * * * *